(12) United States Patent
Ishii et al.

(10) Patent No.: US 11,415,958 B2
(45) Date of Patent: Aug. 16, 2022

(54) DATA EXTRACTING APPARATUS, DATA EXTRACTING METHOD, AND RECORDING MEDIUM

(71) Applicant: Hitachi, Ltd., Tokyo (JP)

(72) Inventors: Daisuke Ishii, Tokyo (JP); Yuji Ogata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 291 days.

(21) Appl. No.: 16/812,886

(22) Filed: Mar. 9, 2020

(65) Prior Publication Data

US 2021/0063991 A1 Mar. 4, 2021

(30) Foreign Application Priority Data

Sep. 3, 2019 (JP) .............................. JP2019-160623

(51) Int. Cl.
G05B 19/05 (2006.01)

(52) U.S. Cl.
CPC .. G05B 19/058 (2013.01); *G05B 2219/14006* (2013.01); *G05B 2219/14097* (2013.01); *G05B 2219/14098* (2013.01)

(58) Field of Classification Search
USPC ......................................................... 700/79
See application file for complete search history.

(56) References Cited

U.S. PATENT DOCUMENTS

| | | | | |
|---|---|---|---|---|
| 4,718,025 A | * | 1/1988 | Minor .................. | G01F 15/063 345/440 |
| 9,112,779 B2 | * | 8/2015 | Yamada ............. | H04L 43/0817 |
| 10,360,196 B2 | * | 7/2019 | Hsiao ...................... | G06F 16/22 |
| 2004/0243256 A1 | * | 12/2004 | Willis ................ | G05B 19/4183 700/21 |
| 2013/0144407 A1 | * | 6/2013 | Nausley ............. | G05B 23/0264 700/79 |
| 2016/0274552 A1 | * | 9/2016 | Strohmenger ......... | G06Q 10/06 |
| 2019/0278247 A1 | * | 9/2019 | Abe .................... | G05B 23/0235 |
| 2020/0133244 A1 | * | 4/2020 | Kamiguchi ........ | G05B 23/0272 |
| 2020/0333759 A1 | * | 10/2020 | Kim .................... | G06F 12/0238 |
| 2020/0336390 A1 | * | 10/2020 | Hsiao ...................... | H04L 41/22 |

FOREIGN PATENT DOCUMENTS

JP    9-196714 A    7/1997

\* cited by examiner

*Primary Examiner* — Md Azad
(74) *Attorney, Agent, or Firm* — Crowell & Moring LLP

(57) ABSTRACT

A data extracting apparatus comprises: a processor configured to execute a program; and a storage device configured to store the program, the data extracting apparatus being configured to access: configuration information that defines a work environment including a group of sensors; and a data extraction rule, which is used for extraction from the configuration information, and is defined for each event that indicates one of a change and abnormality of the work environment, and the processor being configured to execute: detection processing of detecting a specific event based on sensor data from the group of sensors; extraction processing of extracting related data related to the specific event from specific configuration information corresponding to an acquisition time of the sensor data out of the configuration information, based on a specific data extraction rule corresponding to the specific event; and output processing of outputting the related data.

13 Claims, 14 Drawing Sheets

```
{"production_model":
    {"id" : "P01",
      "line" : [ {
          "id" : "L01",
          "iot_gatway" : [ {
              "id": G01,
              "plc" : [ {
                  "id":"P01",
                  "robot" : [ {
                      "id": "R01",
                      "location": "(x1,y1)",
                      "sensor" : [ {
                            "id" : "S01",
                            "type" : "vibration"
                          },
                          {"id" : "S02",
                            "type" : "current"
                            "next" : "R02"
                          }
                      ] },
                      {"id": "R02",
                        "location": "(x2,y2)",
                        "sensor" : [ {
                            "id" : "S03",
                            "type" : "vibration"
                          },
                          {"id" : "S04",
                            "type" : "current"
                            "next" : "P02"
                          }
                      ] }
                  ] },
                  {"id":"P02",
                    "robot" : [ {
                        "id": "R03",
                        "location": "(x3,y3)",
                        "sensor" : [ {"id" : "S05",
                            "type" : "vibration"
                          },
                          {"id" : "S06",
                            "type" : "current"
                            "next" : "L02"
                          } ],
                    } ],
                  },
              } ],
            } ],
        } ],
      }
}
```

```
{"manager" : [ {
    "id": H03,
    "worker" : [ {
        "id":"P01",
        "worker" : [ {
            "id": "H01",
            "sensor" : [ {
                "id" : "S11",
                "type" : "location"
            },
            {"id" : "S12",
                "type" : "temperature"
            }
        ] },
        {"id": "H02",
            "sensor" : [ {
                "id" : "S13",
                "type" : "location"
            },
            {"id" : "S14",
                "type" : "temperature"
            }
        ] }
    } ]
    }
}
```

FIG.6

| TIME | GRAPH-FORM DATABASE ID |
|---|---|
| 2019/4/1 09:00:00 | G20190401090000 |
| 2019/3/31 13:00:00 | G20190331130000 |
| 2019/3/31 08:00:00 | G20190331080000 |
| ⋮ | ⋮ |

FIG.7

| RULE ID | EVENT ID | KEY CALCULATION METHOD | ACQUISITION DATA CONDITION |
|---|---|---|---|
| R1001 | E0001 | (1) ACQUIRE WORKER ID ABOVE SENSOR ID<br><br>(2) ACQUIRE LATEST LOCATION INFORMATION ON WORKER ID ACQUIRED IN STEP (1)<br><br>(3) CALCULATE DISTANCES BETWEEN LOCATION INFORMATION ACQUIRED IN STEP (2) AND MACHINES, AND SET ID OF CLOSEST MACHINE AS KEY | • MACHINE ID SERVING AS KEY<br><br>• ID OF PRODUCTION LINE ABOVE MACHINE IDENTIFIED BY MACHINE ID SERVING AS KEY |
| R1002 | E0002 | SET MACHINE ID ABOVE SENSOR ID AS KEY | • MACHINE ID SERVING AS KEY<br><br>• MACHINE ID OF MACHINE BEFORE MACHINE IDENTIFIED BY MACHINE ID SERVING AS KEY. WHEN DIRECTLY COUPLED MACHINE DOES NOT EXIST, COUPLING RELATIONSHIP IS TRACED FROM UPPER LEVEL.<br><br>• MACHINE ID OF MACHINE AFTER MACHINE IDENTIFIED BY MACHINE ID SERVING AS KEY. WHEN DIRECTLY COUPLED MACHINE DOES NOT EXIST, COUPLING RELATIONSHIP IS TRACED FROM UPPER LEVEL. |
| ⋮ | ⋮ | ⋮ | ⋮ |

361 DATA EXTRACTION RULE

EVENT DISPLAY

2019/4/1 09:00:51
WARNING !
ABNORMALITY HAS OCCURRED IN ROBOT R02
CHECK COUPLINGS TO R01 AND R03,
AND PROCESS FLOW

RELATED DATA SEARCH

EVENT SELECTION

▼ VIBRATION SENSOR VALUE OF MACHINE IS EQUAL TO OR HIGHER THAN 20

DATA EXTRACTION (KEYWORD SEARCH)

NEARBY MACHINE

FIG.16

DATA EXTRACTING APPARATUS, DATA EXTRACTING METHOD, AND RECORDING MEDIUM

CLAIM OF PRIORITY

The present application claims priority from Japanese patent application JP 2019-160623 filed on Sep. 3, 2019, the content of which is hereby incorporated by reference into this application.

BACKGROUND

This invention relates to a data extracting apparatus configured to extract data, a data extracting method, and a recording medium.

A service of analyzing data collected from devices such as sensors to provide a value-added solution has emerged as a result of development of the Internet of Things (IoT).

Factories are known as an example of a target of application of the IoT. When the IoT is applied to a factory, sensor data is collected from sensors mounted to production machines and workers in the factory, and states and efficiencies of a production process of the factory are visualized and analyzed, to thereby detect abnormality of production sites, improve production plans and the production process, and increase production techniques of the workers, for example.

As a specific example of the solution of applying the IoT to a factory, there is a solution of associating sensor data collected from machines of the factory and configuration data on a production line with each other, to thereby analyze states and efficiencies of production lines of the factory. The configuration data on the production line in this case refers to an order of coupling the machines installed in the production line, types of the machines to be used, products to be produced, and the like. Hitherto, an operation of associating the sensor data with the configuration data on the production line has been manually performed, and all the data is manually viewed and selected, which results in a problematic increase in workload of associating pieces of data with each other.

For example, when abnormality of the machine or the worker of a factory is detected from the sensor data, information on not only the machine and the worker, but also on machines coupled before and after the machine, and workers involved in the operation of the machine is required in order to analyze and cope with the abnormality. The configuration of the production line is changed depending on a product to be produced, and locations and states of the workers also change depending on a work schedule. Thus, a technical problem is to reduce workloads required for associating pieces of data with each other in accordance with those changes.

To address this technical problem, in JP 09-196714 A, there is disclosed an operation history management apparatus in a plant monitoring system. The operation history management apparatus includes: a collected information item managing apparatus configured to receive an event output from an operation monitoring apparatus and an event output from a control apparatus, and specify an information item to be collected in accordance with details of the events; a related-information collecting apparatus configured to collect related information on the specified item from a control apparatus or an operation monitoring apparatus based on the information item specified by the collected information item managing apparatus, and record the related information in association with time information; and a related-information displaying apparatus configured to display the related information collected by the related information collecting apparatus at least in time series.

However, the related information described in JP 09-196714 A is information on a location and a state of a main body of an apparatus in which the event has occurred, and there is no disclosure of a system for managing information on, for example, a peripheral machine or a worker, whose involvement changes as the time elapses.

Moreover, the related information is statically set in JP 09-196714 A, but both of the configuration data and sensor data on the production line of the factory change as the time elapses in the above-mentioned solution of analyzing the states and efficiencies of the production line of the factory. Thus, in JP 09-196714 A, the static information cannot be associated, and a search key cannot be specified.

SUMMARY

This invention has an object to reduce the workload of extracting data related to an event indicated by sensor data.

An aspect of the invention disclosed in the present application is a data extracting apparatus, comprising: a processor configured to execute a program; and a storage device configured to store the program, the data extracting apparatus being configured to access: configuration information that defines a work environment including a group of sensors; and a data extraction rule, which is used for extraction from the configuration information, and is defined for each event that indicates one of a change and abnormality of the work environment, and the processor being configured to execute: detection processing of detecting a specific event based on sensor data from the group of sensors; extraction processing of extracting related data related to the specific event from specific configuration information corresponding to an acquisition time of the sensor data out of the configuration information, based on a specific data extraction rule corresponding to the specific event detected by the detection processing; and output processing of outputting the related data extracted by the extraction processing.

According to this invention, it is possible to reduce the workload of extracting the data related to the event indicated by the sensor data. Other objects, configurations, and effects than those described above are clarified by the following description of an embodiment.

BRIEF DESCRIPTION OF THE DRAWINGS

FIG. 4 is an explanatory diagram for illustrating an example of the machine configuration information.

FIG. 6 is an explanatory diagram for illustrating an example of the worker configuration information.

FIG. 7 is an explanatory table for showing an example of the configuration data.

FIG. 11 is an explanatory table for showing an example of the data extraction rule.

FIG. 15 is an explanatory diagram for illustrating an example of the display (corresponding to Step S1328 of FIG. 13) by the event displaying module.

FIG. 16 is an explanatory diagram for illustrating an example of a display by the searching/displaying module.

DETAILED DESCRIPTION OF THE EMBODIMENTS

Figure 1:
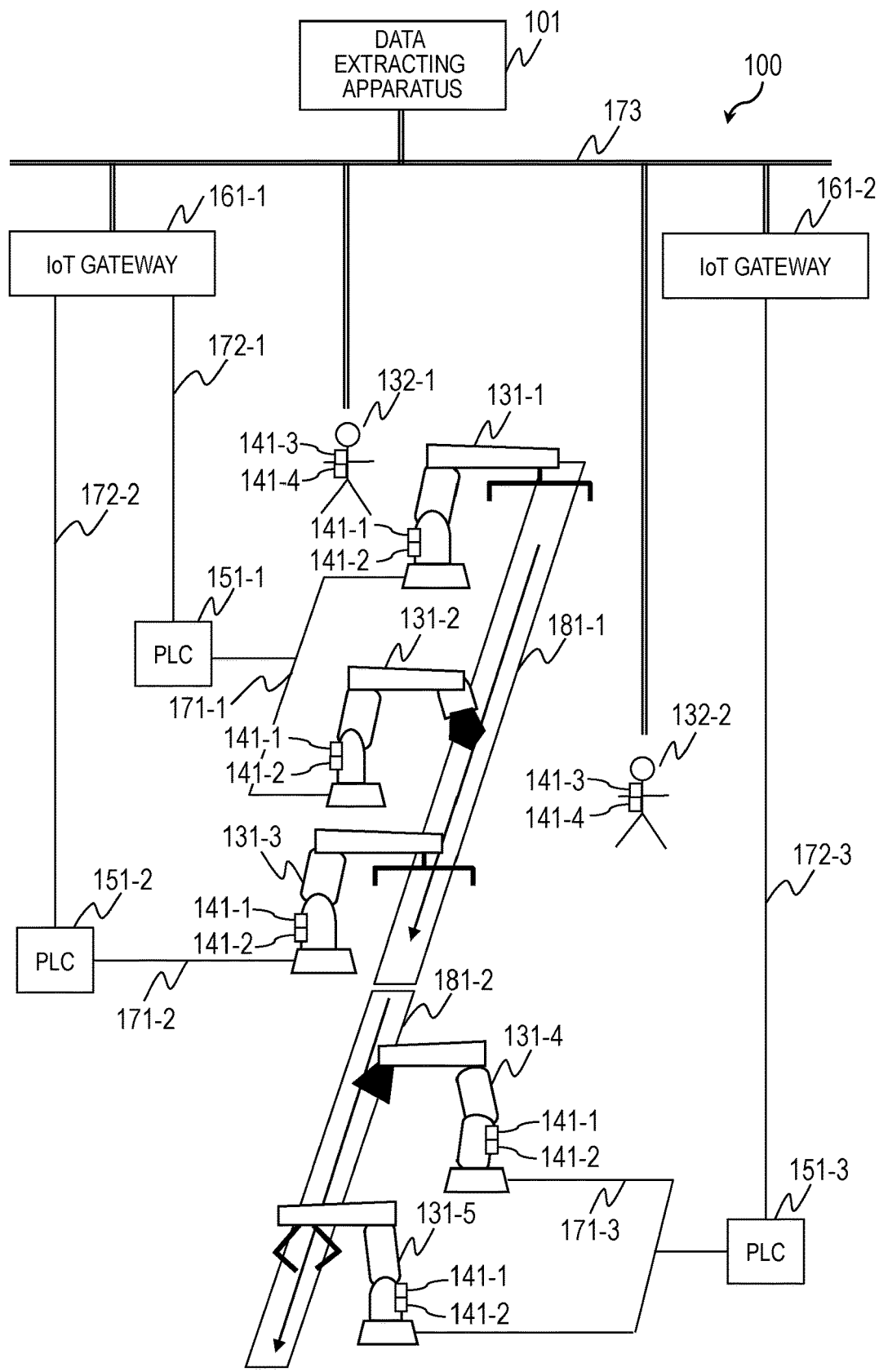
FIG. 1 is an explanatory diagram for illustrating an example of a work environment.

Now, a description is given of at least one embodiment of this invention with reference to the drawings. It should be noted that this invention is not to be construed by limiting the invention to the content described in the following at least one embodiment. A person skilled in the art would easily recognize that specific configurations of this invention may be changed within the scope of the concept and the gist of this invention.

In the following description, the same or similar components or functions are denoted by the same reference numerals, and a redundant description thereof is omitted here. Moreover, even in a case where different sub numbers are assigned to the same reference numeral, the reference numeral without the sub numbers is used when components with those different sub numbers are not distinguished from one another.

<Example of Work Environment>

FIG. 1 is an explanatory diagram for illustrating an example of a work environment. A work environment 100 has two production lines 181-1 and 181-2. Machines 131 being production apparatus are arranged in each production line 181. Three machines of a machine 131-1, a machine 131-2, and a machine 131-3 are arranged in the production line 181-1. Two machines of a machine 131-4 and a machine 131-5 are arranged in the production line 181-2. Two types of sensors, which are a sensor 141-1 configured to measure vibration and a sensor 141-2 configured to measure current, are mounted to each machine 131. In at least one embodiment, the sensor 141-1 and the sensor 141-2 are built into each machine 131.

Two workers 132-1 and 132-2 are arranged in the work environment 100 to, for example, operate and inspect each machine 131. A sensor 141-3 configured to measure a location and a sensor 141-4 configured to measure temperature are mounted to each worker 132. In at least one embodiment, for example, the worker 132 wears a smartwatch incorporating the sensors 141-3 and 141-4 so that the location measurement and the temperature measurement are executed for the worker 132.

The machine 131 is coupled to a programmable logic controller (PLC) 151 through an intra-factory network 171.

The PLC 151 is an apparatus configured to control and manage the machine 131, and serves to collect sensor data of the sensors 141 built into the machine 131 in at least one embodiment. The PLC 151 is coupled to an IoT gateway 161 through the intra-factory network 172.

The IoT gateway 161 transmits information such as the sensor data acquired from the PLC 151, which is a coupling destination, to a server built on a network 173 outside the factory, for example, the Internet. The IoT gateway 161 transfers, to the PLC 151, data received from the server built on the network 173 outside the factory. In at least one embodiment, the IoT gateway 161 serves to collect and assemble the data of the PLC 151, and transmit the data to the data extracting apparatus 101.

The worker 132 wears the smartwatch. The smartwatch transmits, to the data extracting apparatus 101, the sensor data from the sensor 141-3 configured to measure the location and the sensor 141-4 configured to measure the temperature, which are built into the smartwatch.

<Hardware Configuration Example of Data Extracting Apparatus>

Figure 2:
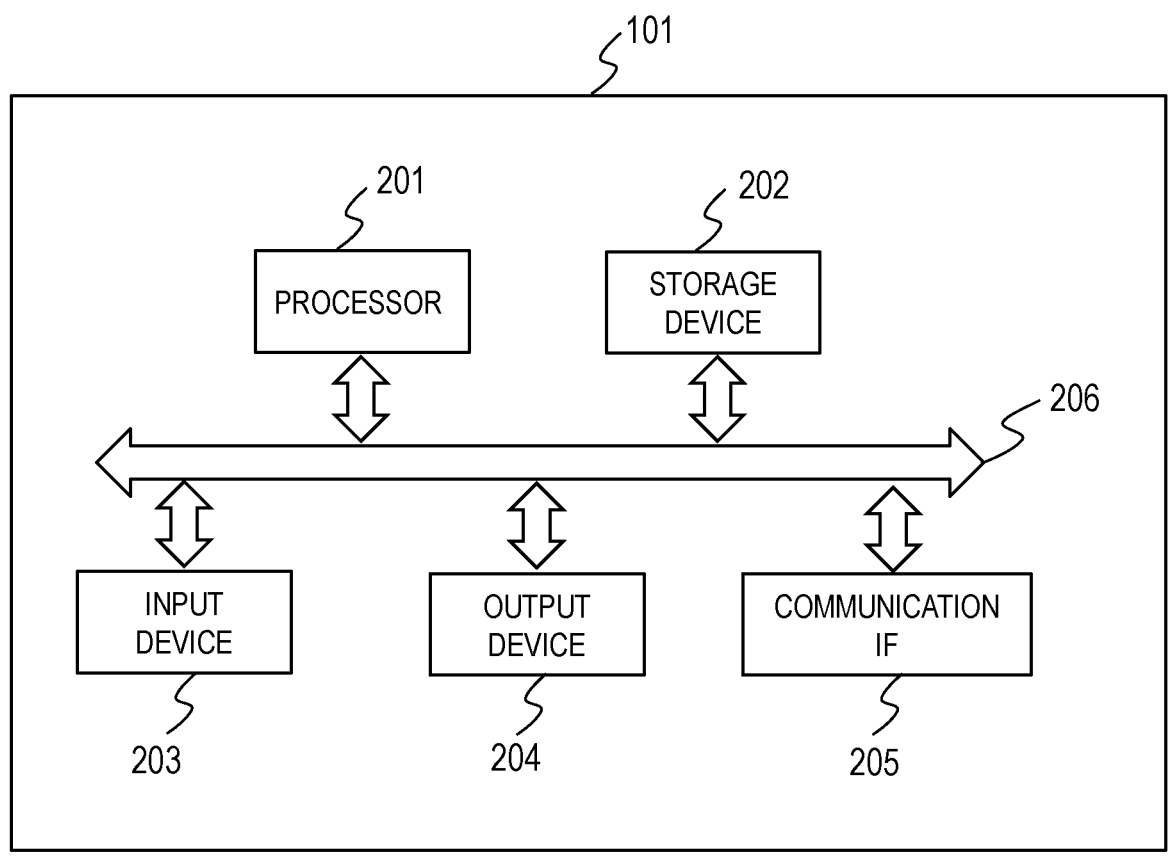
FIG. 2 is a block diagram illustrating a hardware configuration example of the data extracting apparatus.

FIG. 2 is a block diagram illustrating a hardware configuration example of the data extracting apparatus 101. The data extracting apparatus 101 includes a processor 201, a storage device 202, an input device 303, an output device 204, and a communication interface (communication IF) 205. The processor 201, the storage device 202, the input device 303, the output device 204, and the communication IF 205 are connected to one another by a bus 206. The processor 201 controls the detection apparatus 207. The processor 301 executes various programs. The storage device 202 serves as a work area of the processor 201. The storage device 202 is a recording medium which stores the various programs and data. The storage device 202 can be, for example, a read-only memory (ROM), a random access memory (RAM), a hard disk drive (HDD), or a flash memory. The input device 203 inputs data. The input device 203 can be, for example, a keyboard, a mouse, a touch panel, a ten-key pad, or a scanner. The output device 204 outputs data. The output device 204 can be, for example, a display or a printer. The communication IF 205 couples to a network to transmit and receive data.

<Functional Configuration Example of Data Extracting Apparatus>

Figure 3:
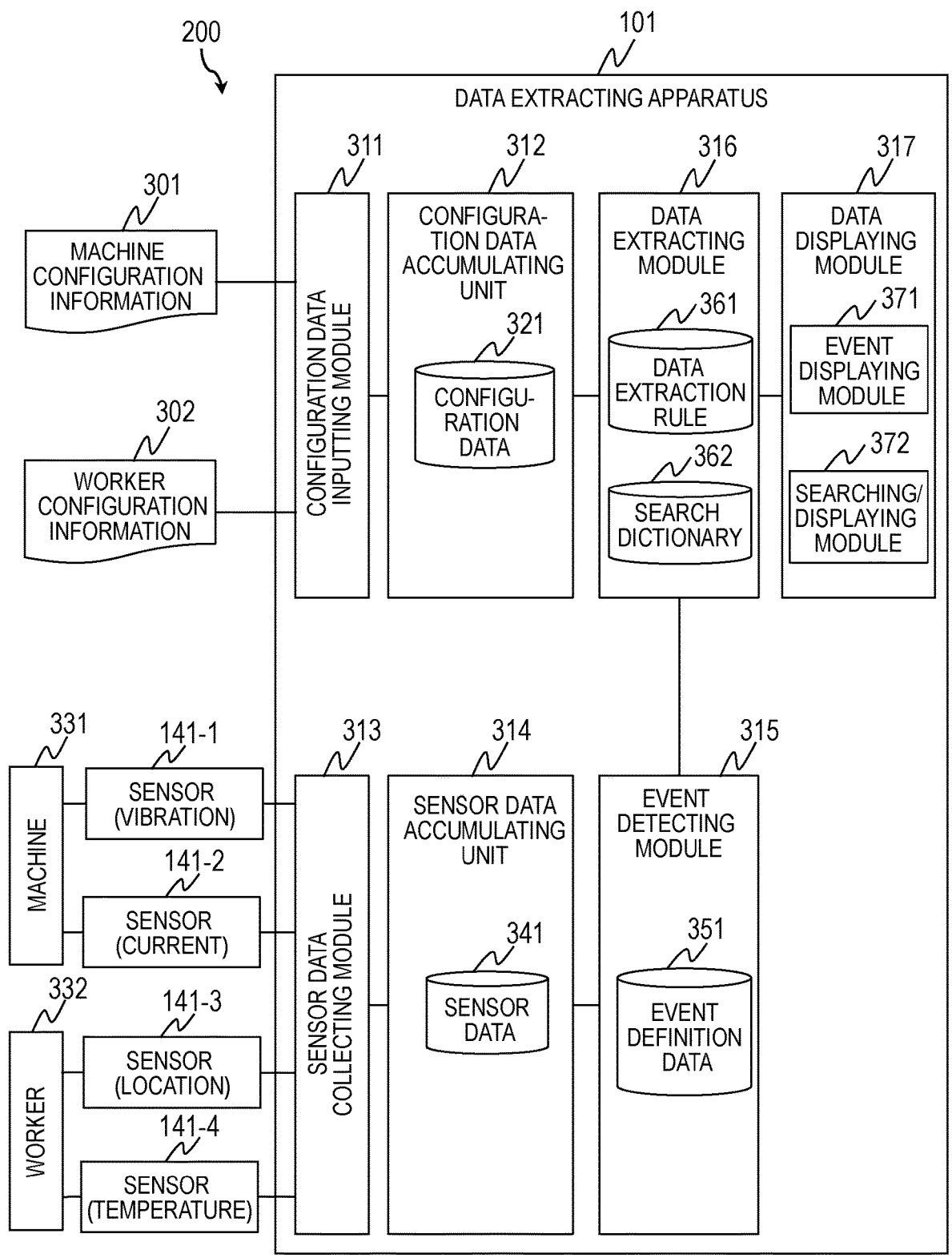
FIG. 3 is a block diagram for illustrating a configuration example of a data extracting system.

FIG. 3 is a block diagram for illustrating a configuration example of a data extracting system. A data extracting system 200 includes the data extracting apparatus 101, the machines 131, and the sensors 141. The sensors 141 are coupled to the data extracting apparatus 101. The sensor 141 is mounted to the machine 131 or the worker 132, and transmits the state of the machine 131 or the worker 132 as the sensor data to the data extracting apparatus 101. There are a plurality of types of sensor data to be measured by the sensor 141, such as temperature, humidity, vibration, current, and location.

The data extracting apparatus 101 includes a configuration data inputting module 311, a configuration data accumulating unit 312, a sensor data collecting module 313, a sensor data accumulating unit 314, an event detecting module 315, a data extracting module 316, and a data displaying module 317. The configuration data inputting module 311, the sensor data collecting module 313, the event detecting module 315, the data extracting module 316, and the data displaying module 317 are specifically functions to be implemented by, for example, the processor 201 executing programs stored in the storage device 202 illustrated in FIG. 2. The configuration data accumulating unit 312 and the sensor data accumulating unit 314 are specifically functions to be implemented by, for example, the storage device 202 illustrated in FIG. 2.

The configuration data inputting module 311 has a function of acquiring machine configuration information 301 indicating the types of the machine 131, a coupling relationship among the machines 131, and the like in the work environment 100 and worker configuration information 302 indicating information on the workers 132 performing work in the work environment 100, and inputting configuration data 321 to the configuration data accumulating module 312.

FIG. 4 is an explanatory diagram for illustrating an example of the machine configuration information 301. FIG. 4 is a diagram for illustrating machine configuration information 301 on the production line 181-1. The example illustrated in FIG. 4 is the machine configuration information 301 described in a data format of the JavaScript (trademark) Object Notation (JSON). In the machine configuration information 301, a hierarchical structure including a production model ("production model") that executes the production in the work environment 100 as an apex, information ("line") on the production line 181-1 below the production model, information ("iot_gateway") on the IoT gateway 161-1 below the production line 181-1, and information ("plc") on the PLC 151-1 and the PLC 151-2 below the IoT gateway 161-1 is described.

In the machine configuration information 301, a hierarchical structure including information ("robot") on the machines 131-1 and 131-2 below the PLC 151-1 and information ("robot") on the machine 131-3 below the PLC 151-2 is described. In the machine configuration information 301, a hierarchical structure including information ("sensor") on the sensor 141-1 and the sensor 141-2 below each of the machines 131-1, 131-2, and 131-3 is described.

As information on each component of the machine configuration information 301, an identifier ("id") is essential. Other information may be optionally added. In the machine configuration information 301 in at least one embodiment, location information ("location") is added as information on the machine 131 ("robot"), and a type ("type") of the sensor is added as information on the sensor 141 so that the sensor 141-1 ("type": "vibration") configured to measure the vibration and the sensor 141-2 ("type": "current") configured to measure the current can be identified.

In FIG. 4, the information is described in the JSON data format, but the information may be described in another data format. For example, the information may similarly be described in the Extensible Markup Language (XML) format, or an original data format may be defined. Moreover, the machine configuration information 301 of FIG. 4 may be divided into a plurality of pieces of information. For example, the machine configuration information on the production line 181-2 may be a file different from that of the machine configuration information 301 of the production line 181-1.

Figure 5:
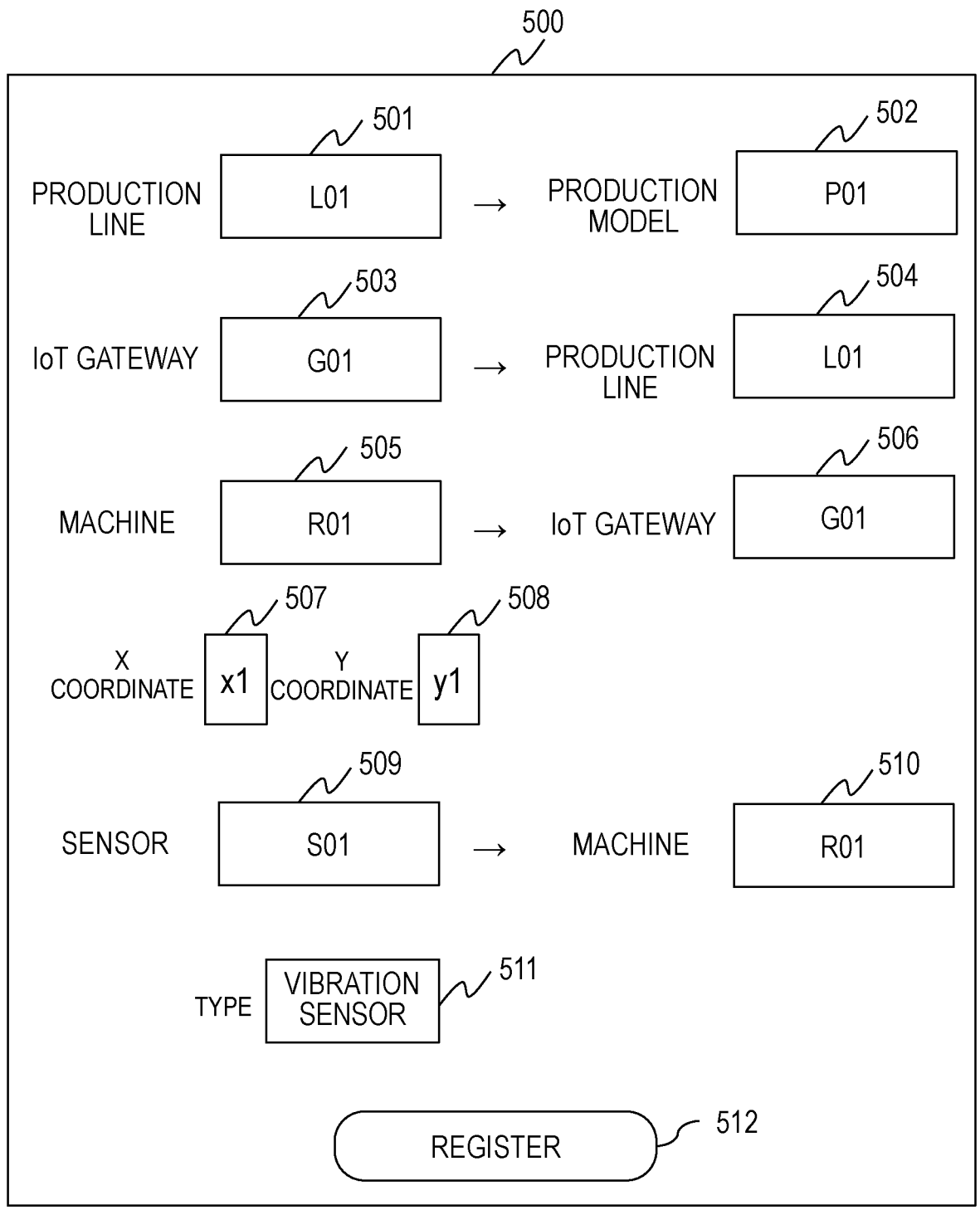
FIG. 5 is an explanatory diagram for illustrating an example of an input screen of the configuration data inputting module.

FIG. 5 is an explanatory diagram for illustrating an example of an input screen of the configuration data inputting module 311. The input screen 500 includes a first input field 501 to an eleventh input field 511 and a registration button 512. The identification information on the production line 181 can be input to the first input field 501. The identification information on the production model can be input to the second input field 502. The identification information on the IoT gateway 161 can be input to the third input field 503.

The identification information on the production line 181 can be input to the fourth input field 504. The identification information on the machine 131 can be input to the fifth input field 505. The identification information on the IoT gateway 161 can be input to the sixth input field 506. The location information on the machine 131 can be input to the seventh input field 507 and the eighth input field 508. The identification information on the sensor 141 can be input to the ninth input field 509. The type of the sensor 141 can be input to the eleventh input field 511.

On the input screen 500, the components identified by the identification information input to the second input field 502, the fourth input field 504, the six input field 506, and the tenth input field 510 on the right side are positioned above in the machine configuration information 301. A relationship between the production model and the production line 181 is registered in the machine configuration information 301 through use of the first input field 501 and the second input field 502. A relationship between the IoT gateway and the production line 181 is registered in the machine configuration information 301 through use of the third input field 503 and the fourth input field 504.

A relationship between the IoT gateway 161 and the machine 131 is registered in the machine configuration information 301 through use of the fifth input field 505 and the sixth input field 506. A relationship between the machine 131 and the sensor 141 is registered in the machine configuration information 301 through use of the seventh input field 507 to the eleventh input field 511. In such a manner, the configuration data inputting module 311 can input the machine configuration information 301.

FIG. 6 is an explanatory diagram for illustrating an example of the worker configuration information 302. Similarly to the machine configuration information 301 of FIG. 4, the example illustrated in FIG. 6 is described in the JSON data format. In the worker configuration information 302, a hierarchical structure including a manager ("manager") as an apex, information ("worker") on the worker 132 below the manager, and information ("sensor") on the sensors 141-3 and the sensor 141-4 below the worker 132 is described.

As information on each component of the worker configuration information 302, an identifier ("id" of FIG. 6) is essential. Other information may be optionally added. In at least one embodiment, the sensor 141-3 ("type": "location") configured to measure the location and the sensor 141-4 ("type": "temperature") configured to measure the temperature are identified.

In FIG. 6, the information is described in the JSON data format, but the information may be described in another data format. For example, the information may be described in the XML format, or an original data format may be defined. Moreover, as in FIG. 5, a relationship between the manager and the worker 132 and a relationship between the worker 132 and the sensor 141 may be input on an input screen (not shown) of the configuration data inputting module 311. The configuration data accumulating unit 312 accumulates the machine configuration information 301 and the worker configuration information 302 acquired from the configuration data inputting module 311 as the configuration data 321, which is a database in a graph form.

FIG. 7 is an explanatory table for showing an example of the configuration data 321. The configuration data 321 is expressed as a table having, for example, a time 701 and a graph-form database ID 702 as fields. The time 701 is a predetermined time at which the graph-form database ID 702 is stored. The time 701 may be a time at a certain interval or a time at which the configuration is changed. In such a manner, the graph-form database ID 702, namely, the machine configuration information 301 and the worker configuration information 302 are periodically or non-periodically registered.

Figure 8:
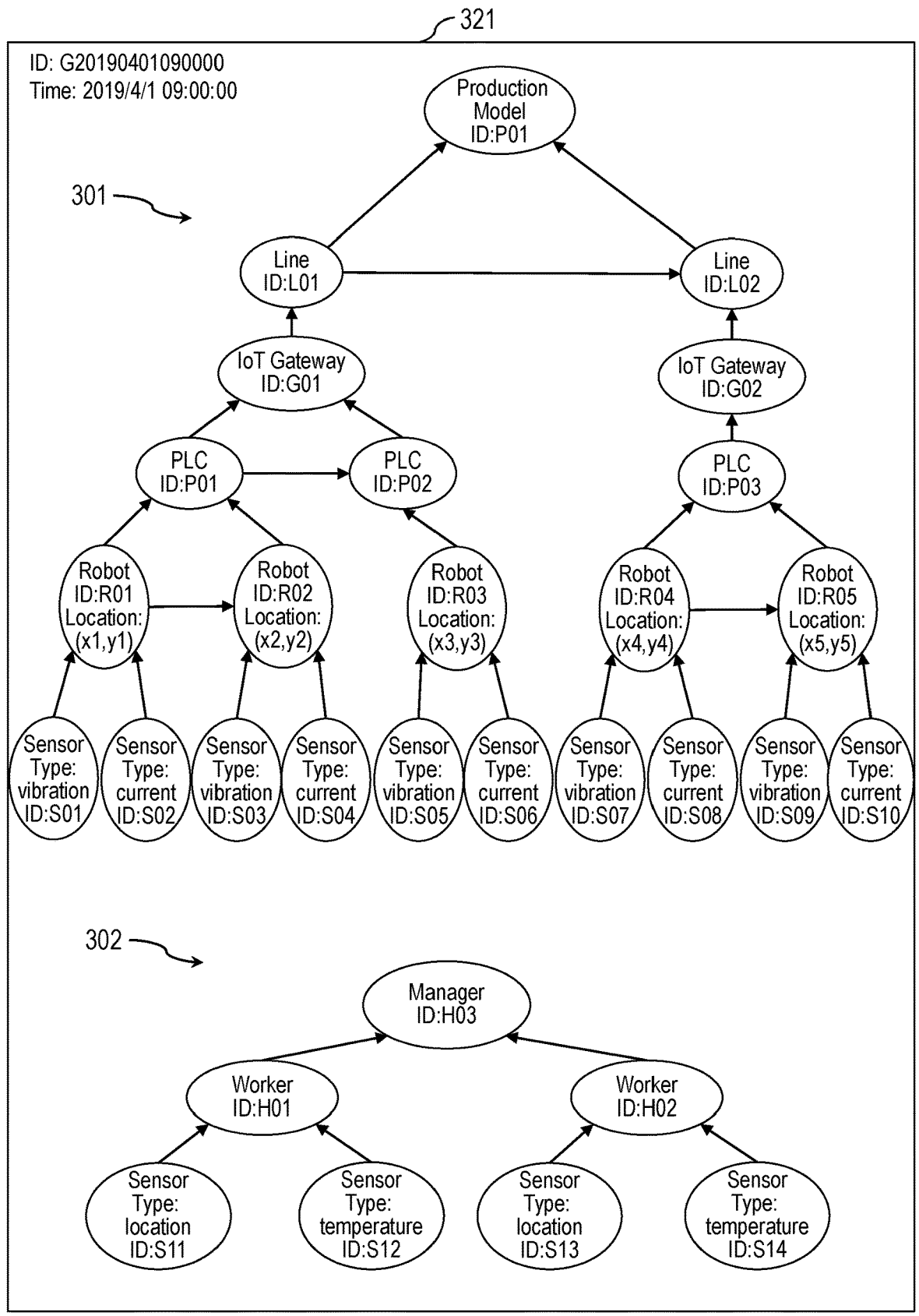
FIG. 8 is an explanatory diagram for illustrating an example of the graph-form database of the configuration data.

The graph-form database ID 702 is an identifier of a database in a graph form indicating the machine configuration information 301 and the worker configuration information 302. An entry is added to the table of the configuration data 321 each time the data extracting apparatus 101 creates or updates the configuration data 321 in response to input of the machine configuration information 301 and the worker configuration information 302. As illustrated in FIG. 8 described later, details of the machine configuration information 301 and the worker configuration information 302 can be checked by referring to the graph-form database ID 702 of the configuration data 321.

FIG. 8 is an explanatory diagram for illustrating an example of the graph-form database of the configuration data 321. The configuration data 321 represents the details of the machine configuration information 301 in the graph form. In the machine configuration information 301 in the graph form, relationships among the production model, the production lines 181, the IoT gateways 161, the machines 131, and the sensors 141 are represented by coupling those components by arrows. Similarly, the configuration data 321 also represents the details of the worker configuration information 302 in the graph form. In the graph form, in the worker configuration information 301, relationships among the manager, the workers 132, and the sensors 141 are represented by coupling those components by arrows.

Referring back to FIG. 3, the sensor data collecting module 313 has a function of receiving the sensor data from the plurality of sensors 141, and inputting the sensor data to the sensor data accumulating unit 314. The sensor data collecting module 313 may directly receive the data from the sensors 141, or as illustrated in FIG. 1, may receive the sensor data through a machine such as the PLC 151 and the IoT gateway 161 other than the sensors 141.

The sensor data accumulating unit 314 accumulates the sensor data 341 acquired from the sensor data collecting module 313 as the sensor data 341.

Figure 9:
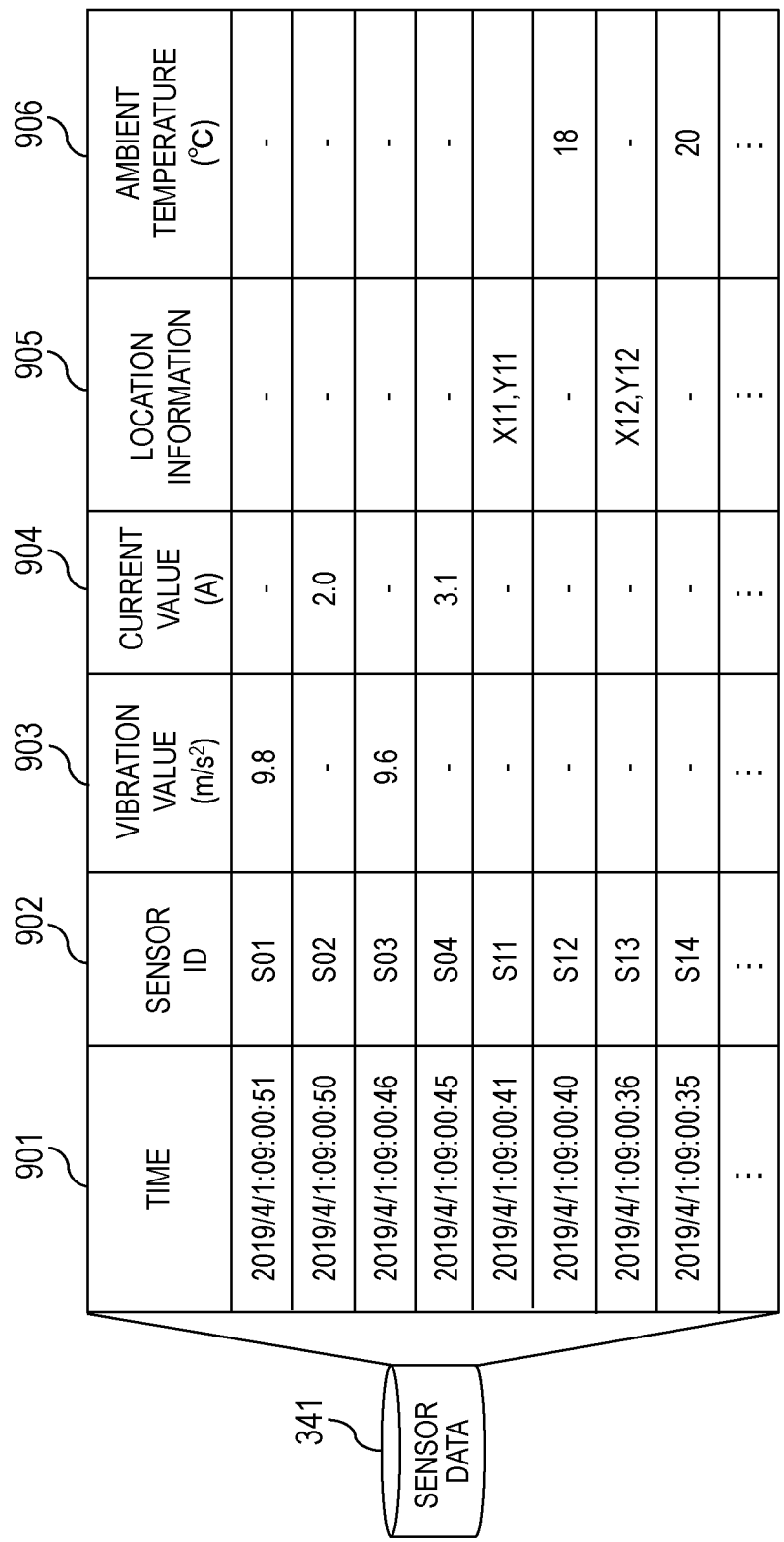
FIG. 9 is an explanatory table for showing an example of the sensor data.

FIG. 9 is an explanatory table for showing an example of the sensor data 341. The sensor data 341 is represented as a table having a time 901, a sensor ID 902, a vibration value 903, a current value 904, location information 905, and an ambient temperature 906 as fields. The time 901 is a time at which the sensor data 341 has been transmitted from the sensor 141 to the sensor data accumulating unit 314, namely, an acquisition time of the sensor data 341. The sensor ID 902 is identification information that uniquely identifies the sensor 141 being a detection source of the sensor data 341.

The vibration value 903 is the sensor data 341 of the sensor 141-1 configured to measure the vibration. The current value 904 is the sensor data 341 of the sensor 141-2 configured to measure the current. The location information 905 is the sensor data 341 of the sensor 141-3 configured to measure the location, and indicates a location of the sensor 141-3. The ambient temperature 906 is the sensor data 341 of the sensor 141-4 configured to measure the temperature, and indicates an ambient temperature of the sensor 141-4.

Referring back to FIG. 3, the event detecting module 315 refers to the sensor data 341 of the sensor data accumulating unit 314, detects a change, abnormality, or the like of the work environment 100 from the value of the sensor data 341, and notifies the data extracting module 316 of the change, the abnormality, or the like.

The event detecting module 315 refers to event definition data 351, to thereby determine whether or not a change, abnormality, or the like of the work environment 100 has occurred. The change, abnormality, or the like of the work environment 100 is hereinafter referred to as "event".

Figure 10:
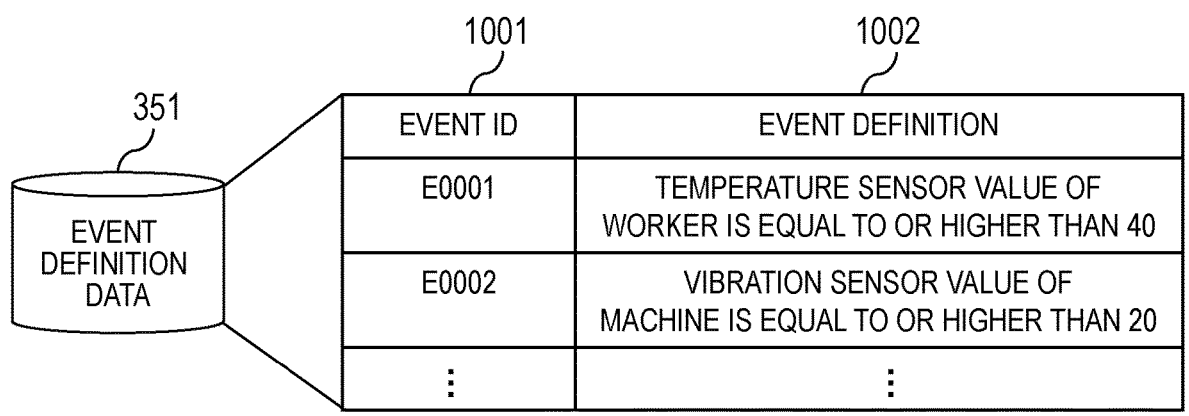
FIG. 10 is an explanatory table for showing an example of the event definition data.

FIG. 10 is an explanatory table for showing an example of the event definition data 351. The event definition data 351 is represented as a table having an event ID 1001 and an event definition 1002 as fields. The event ID 10001 is an identifier indicating an event. The event definition 1002 is a condition to be used to determine whether or not an event has occurred.

In the example of FIG. 10, two types of events are defined. A first event is "the temperature sensor value of the worker 132 is equal to or higher than 40", and is an event detected through use of the value of the sensor data 341 of the sensor 141-4 mounted to the worker 132 to measure the temperature. A second event is "the vibration sensor value of the machine 131 is equal to or higher than 20", and is an event detected through use of the value of the sensor data 341 of the sensor 141-1 mounted to the machine 131 to measure the vibration.

Referring back to FIG. 3, the data extracting module 316 has a function of retrieving and outputting information on the machine 131 and the worker 132 related to an event detected by the event detecting module 315. The data extracting module 316 refers to a data extraction rule 361, and searches for machines 131 and workers 132 related to an event.

FIG. 11 is an explanatory table for showing an example of the data extraction rule 361. The data extraction rule 361 is represented as a table having a rule ID 1101, the event ID 1001, a key calculation method 1102, and an acquisition data condition 1103. The rule ID 1101 is an identifier of a rule for extracting data (hereinafter referred to as "related data") related to an event. The event ID 1001 is an identifier of an event defined in the event definition data 351, and is used to associate a rule for extracting related data and the event with each other.

The key calculation method 1102 defines a method of calculating a key to be used to search for related data from the graph-form database of the configuration data 321. The key is an element in the configuration data 321, and for example, the ID of the machine 131 or the worker ID is set as the key. The acquisition data condition 1103 defines a method of searching for and extracting data related to the event from the graph-form database of the configuration data 321.

In the example of FIG. 11, two types of rules are defined. A first rule is a rule for extracting data related to the event (event ID 1001=E0001) of "the temperature sensor value of the worker 132 is equal to or higher than 40". The key calculation method 1102 is a procedure that defines "(1) acquire a worker ID above a sensor ID 902, (2) acquire latest location information on the worker ID acquired in Step (1), and (3) calculate distances between the location information acquired in Step (2) and robots, and set the ID (machine ID) of a machine 131 having the shortest distance as the key". The acquisition data condition 1103 is a condition of acquiring two pieces of data of "a machine ID serving as a key" and "an ID of a production line 181 above a machine 131 identified by the machine ID serving as a key".

A second rule is a rule for extracting data related to the event (event ID 1001=E0002) of "the vibration sensor value of the machine 131 is equal to or higher than 20". The key calculation method 1102 is a procedure that defines "set a machine ID above a sensor ID 902 as the key". The acquisition data condition 1103 is a condition of acquiring three pieces of data of a machine ID serving as a key, a machine 131 before the machine 131 identified by the machine ID serving as the key, and a machine 131 after the machine 131 identified by the machine ID serving as the key. When a directly coupled machine 131 does not exist, the coupling relationship is traced from the upper level, to thereby acquire related data matching the condition.

Moreover, the data extracting module 316 includes a search dictionary 362 for simplifying the search for related data.

Figure 12:
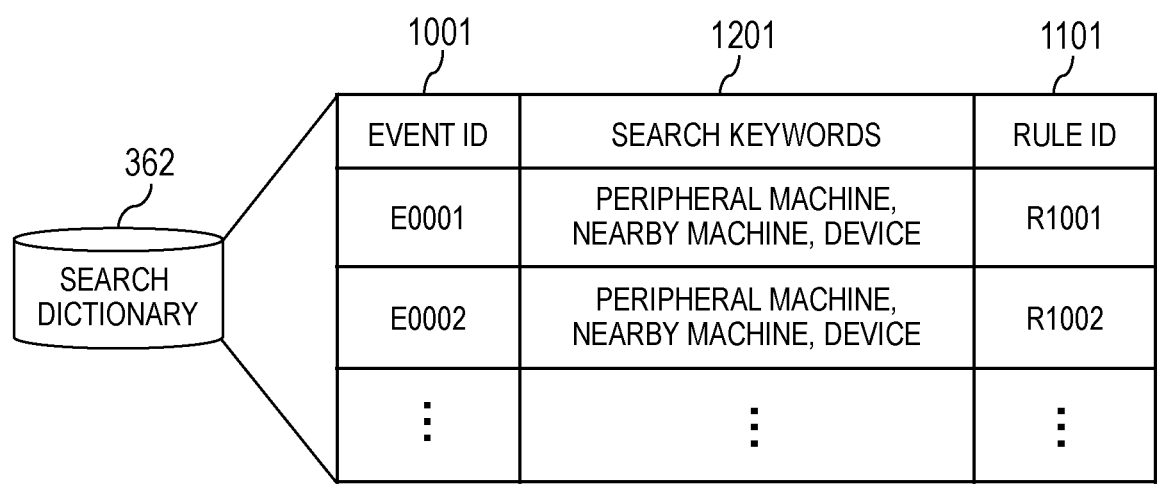
FIG. 12 is an explanatory table for showing an example of the search dictionary2.

FIG. 12 is an explanatory table for showing an example of the search dictionary 362. The search dictionary 362 is represented as a table including the event ID 1001, a search keyword 1201, and the rule ID 1101 as fields. The event ID 1001 is an identifier of an event defined in the event definition data 351. The search keyword 1201 is a keyword to be used to search for related data of the event specified by the event ID 1001. The rule ID 1101 is an identifier of a rule defined in the data extraction rule 361.

A description is now given of a method of using the search dictionary 362. For example, regarding the event (event ID 1001=E0001) of "the temperature sensor value of a worker 132 is equal to or higher than 40", when "Peripheral machine", "Nearby machine", or "Device" is input as the search keyword 1201, two pieces of data of "a machine 131 serving as a key" and "a production line 181 above the machine 131 serving as a key" are displayed as search results based on the acquisition data condition 1103 of the rule ID: R1001 of the data extraction rule 361.

An application that uses the data extracting apparatus 101 can use the search dictionary 362 to acquire related data through use of the search keywords 1201 such as "Peripheral machine", "Nearby machine", and "Device" without being aware of the key calculation method 1102 and the acquisition data condition 1103 defined in the data extraction rule 361.

The data displaying module 317 has a function of displaying the event detected by the event detecting module 315 and the related data output by the data extracting module 316.

Referring back to FIG. 3, the data displaying module 317 uses an event displaying module 371 to display the event detected by the event detecting module 315 and the related data output by the data extracting module 316. A searching/displaying module 372 receives selection of an event, searches for data to be acquired related to the selected event with a keyword, and displays search results. The data displaying module 317 may exist on another computer that can communicate to/from the data extracting apparatus 101. In this case, the data extracting apparatus 101 transmits the results (the event and the related data) extracted by the data extracting module 316 to the another computer. When the another computer receives the extraction results from the data extracting apparatus 101, the another computer uses the data displaying module 317 to display the extraction results.

Figure 13:
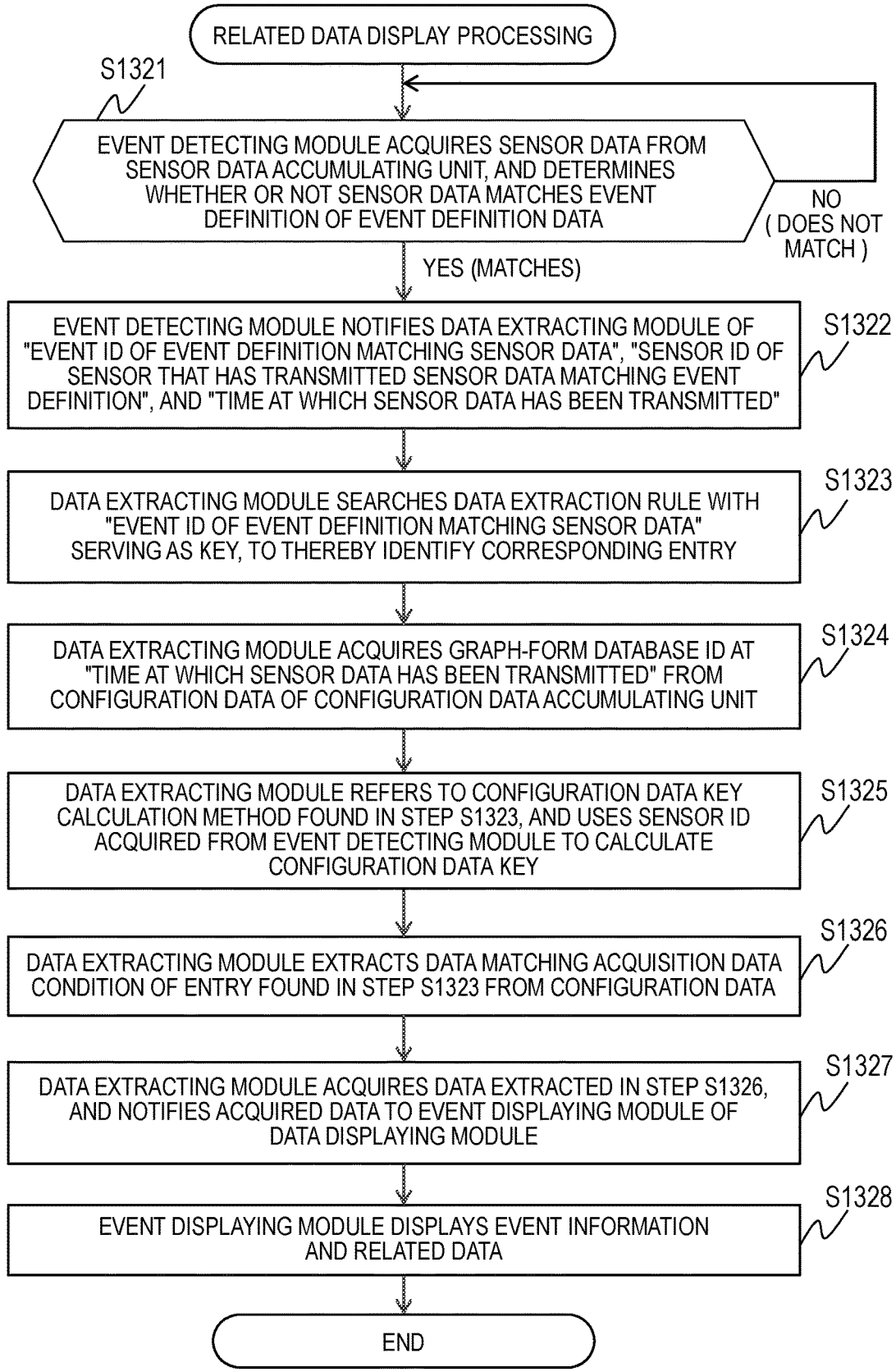
FIG. 13 is a flowchart for illustrating an example of related data display processing.

FIG. 13 is a flowchart for illustrating an example of related data display processing. The event detecting module 315 periodically receives the sensor data 341 from the sensor data accumulating unit 314, and determines whether or not the acquired sensor data 341 matches the event definition 1002 of the event definition data 351 (Step S1321).

When the sensor data 341 matches the event definition 1002 (Yes in Step S1321), the event detecting module 315 executes the related data display processing. When the sensor data 341 does not match the event definition 1002 (No in Step S1321), the event detecting module 315 again acquires the sensor data 341 from the sensor data accumulating unit 314 after a certain period of time, and determines whether or not the acquired sensor data 341 matches the event definition 1002 of the event definition data 351 (Step S1321).

When the sensor data 341 matches the event definition 1002 of the event definition data 351 (Yes in Step S1321), the event detecting module 315 notifies the data extracting module 316 of "the event ID 1001 of the event definition 1002 matching the sensor data 341", "the sensor ID 902 of a sensor that has transmitted the sensor data 341 matching the event definition 1002", and "a time 901 at which the sensor data 341 has been transmitted" (Step S1322).

Then, the data extracting module 316 searches the data extraction rule 361 with "the event ID of the event definition 1002 matching the sensor data 341" serving as a key, to thereby identify a corresponding entry (Step S1323).

Then, the data extracting module 316 acquires the graph-form database ID 702 at "the time 901 at which the sensor data 341 has been transmitted" from the configuration data 321 of the configuration data accumulating unit 312 (Step S1324).

Then, the data extracting module 316 refers to the key calculation method 1102 identified in Step S1323, and uses the sensor ID 902 acquired from the event detecting module 315 to calculate a key (Step S1325).

Then, the data extracting module 316 extracts related data matching the acquisition data condition 1103 of the entry identified in Step S1323 in the data extraction rule 361 from the configuration data 321 illustrated in FIG. 8 and identified by the graph-form database ID 702 acquired in Step S1325 (Step S1326).

Finally, the data extracting module 316 acquires the related data extracted in Step S1326, and notifies the acquired data to the event displaying module 371 of the data displaying module 317 (Step S1327). Then, the event displaying module 371 displays the event information and the related data (Step S1328).

Figure 14:
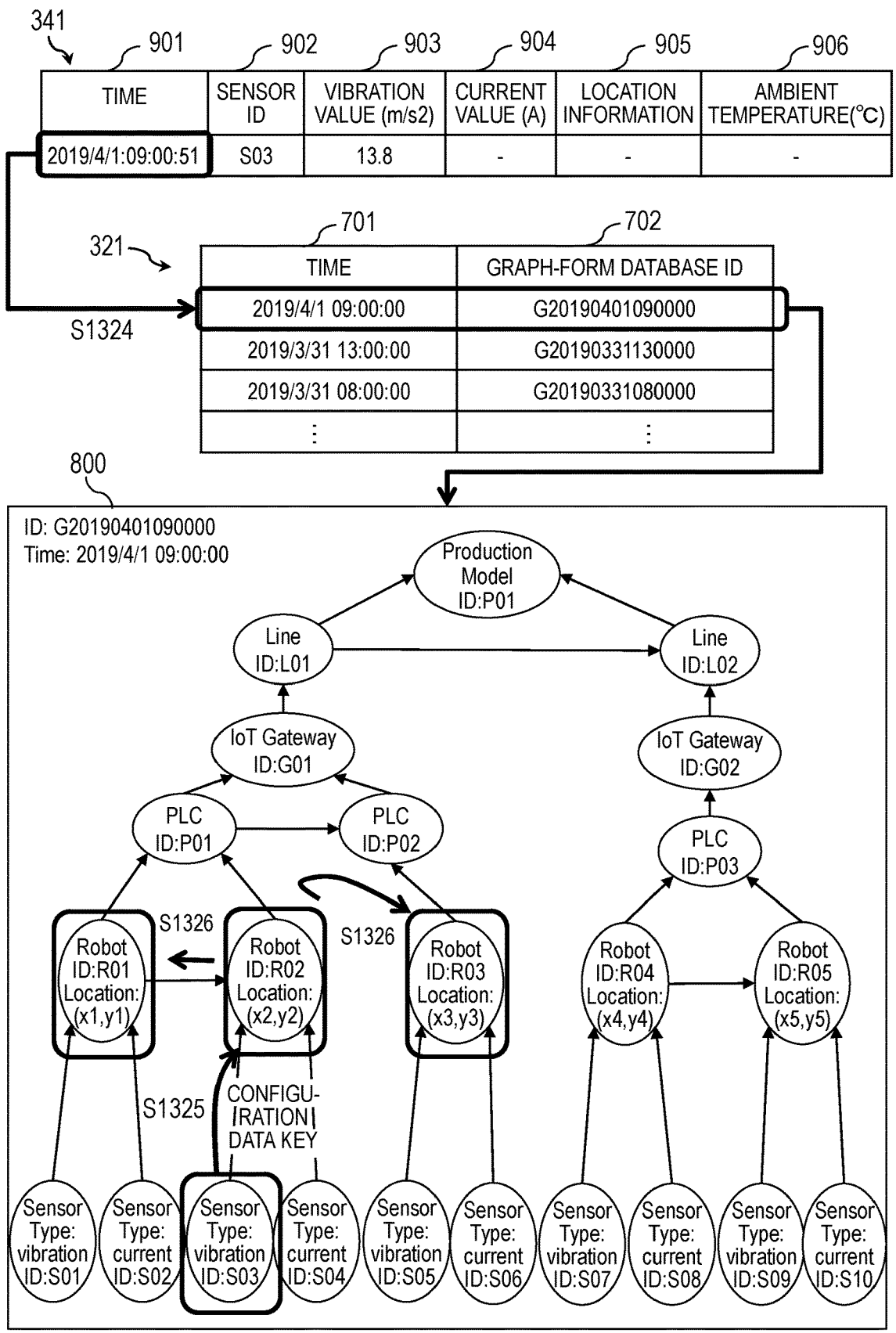
FIG. 14 is an explanatory diagram for illustrating an example of data extraction processing for displaying related data.

FIG. 14 is an explanatory diagram for illustrating an example of data extraction processing for displaying related data. In FIG. 14, there is illustrated an example of data extraction processing to be executed when the event (event ID 1001=E0002) of "the vibration sensor value of the machine 131 is equal to or higher than 20" in the event definition data 351 of FIG. 10 is detected.

In FIG. 14, it is assumed that the event detecting module 315 detects a state in which the vibration sensor value of the sensor ID 902=S03 (corresponding to Step S1321 of FIG. 13) is equal to or higher than 20, and notifies the data extracting module 316 of "E0002", which is "the event ID of the event definition 1002 matching the sensor data 341", "S03", which is "the sensor ID 902 of a sensor that has transmitted the sensor data 341 matching the event definition 1002", and "2019/4/1:09:00:51", which is "the time 901 at which the sensor data 341 has been transmitted" (corresponding to Step S1322 of FIG. 12).

Further, it is assumed that the data extracting module 316 has searched the data extraction rule 361 with "E0002", which is "the event ID of the event definition 1002 matching the sensor data 341" serving as a key, to thereby identify a corresponding entry (entry of rule ID 1101=R1002) (corresponding to Step S1323 of FIG. 12).

In FIG. 14, the data extracting module 316 acquires "G2019040109000" as the graph-form database ID 702 at the time of "2019/4/1:09:00:51", which is the time 901 at which the sensor data 341 has been transmitted, from the configuration data 321 of the configuration data accumulating unit 312 (corresponding to Step S1324 of FIG. 12).

Then, the data extracting module 316 refers to the key calculation method 1102 associated with the event ID 1001 of E0002 in the data extraction rule 361, to thereby calculate the key (corresponding to Step S1325 of FIG. 13). As shown in FIG. 11, "set a machine ID above a sensor ID 902 as the key" is the key calculation method 1102. Thus, the data extracting module 316 refers to the graph-form database 800 having the graph-form database ID 702 of G20190401090000, and sets a machine ID: R02 above the sensor ID 902=S03 in the hierarchical relationship as the key.

Finally, the data extracting module 316 uses the machine ID: R02 as the key to extract the related data (corresponding to Step S1326 of FIG. 13). As shown in FIG. 11, the acquisition data condition 1103 is the condition of acquiring the three pieces of data of "a machine 131 serving as a key", "a machine 131 before the machine 131 serving as the key", and "a machine 131 after the machine 131 serving as the key".

Thus, the data extracting module 316 extracts, as the related data, the following three pieces of data: the machine ID of R02; a machine ID of R01 directly coupled before the machine ID of R02; and a machine ID of R03 coupled after the machine ID of R02 through the PLC above the machine ID of R02 in the hierarchical relationship. The extracted data is notified to the event displaying module 371 (corresponding to Step S1327 of FIG. 13).

FIG. 15 is an explanatory diagram for illustrating an example of the display (corresponding to Step S1328 of FIG. 13) by the event displaying module 371. The event displaying module 371 displays the event detection as a warning by embedding, in sentences, the time 901 of the sensor data 341 and the machine ID of R01, the machine ID of R02, and the machine ID of R03, which are extracted as the related data.

FIG. 16 is an explanatory diagram for illustrating an example of a display by the searching/displaying module 372. In this display, the searching/displaying module 372 can receive a selection of an event, and can use a keyword to search for data to be extracted in association with the event. When the input keyword matches a search keyword 1201 in an entry of the search dictionary 362, the searching/displaying module 372 displays related data in accordance with a data extraction rule corresponding to the rule ID 1101 of the entry of the search dictionary 362.

In such a manner, the two types of display methods of the automatic display illustrated in FIG. 15 and the search illustrated in FIG. 16 can be provided. The display methods of FIG. 15 and FIG. 16 are merely an example, and layouts, wording, and designs of the screens may be changed.

As described above, according to at least one embodiment, in the work environment 100 represented by the production lines 181 of the factory, in which the physical configuration changes every second, the data extracting apparatus 101 collects the sensor data 341 on the machines 131 to be used for the work and the workers 132, and detects an event such as an abnormal state and an environmental change from the collected sensor data 341 indicating different values as the time elapses. When the data extracting apparatus 101 has detected an event, the data extracting apparatus 101 extracts identification information on the machines 131 and the workers 132 related to the detected event as data related to the detected event without manual intervention. As a result, the workload required for extracting the related data can be reduced.

It should be noted that, in the above-mentioned at least one embodiment, the sensor 141 is mounted to the machine 131 and the worker 132, but the sensor 141 may be mounted only to the machine 131, or may be mounted only to the worker 132. In this case, the data extraction rule 361 includes the key calculation method 1102 and the acquisition data condition 1103 that are limited to an object to which the sensor 141 is mounted.

Moreover, in the data extraction rule 361 of FIG. 11, the key calculated in accordance with the key calculation method 1102 is the machine ID, but may be the worker ID. Similarly, the acquisition data condition 1103 includes the machine ID and the ID of the production line 181, but may include the worker ID.

What is claimed is:

1. A data extracting apparatus, comprising:
a processor configured to execute a program; and
a storage device configured to store the program,
the data extracting apparatus being configured to access:
configuration information that defines a work environment including a group of sensors; and a data extraction rule, which is used for extraction from the configuration information, and is defined for each event that indicates one of a change and abnormality of the work environment, and
the processor being configured to execute:
detection processing of detecting a specific event based on sensor data from the group of sensors;
extraction processing of extracting a first related data related to the specific event from specific configuration information corresponding to an acquisition time of the sensor data out of the configuration information, based on a specific data extraction rule corresponding to the specific event detected by the detection processing; and
output processing of outputting the first related data extracted by the extraction processing;
wherein, in the extraction processing, the processor extracts the first related data and a second related data related to the first related data;
wherein, in the output processing, the processor outputs the first related data and the second related data extracted in the extraction processing; and
wherein the configuration information comprises machine configuration information that defines, in a graph form, a hierarchical relationship among the group of sensors and a group of machines that are installed or movable in the work environment.

2. The data extracting apparatus according to claim 1, wherein the configuration information comprises: first configuration information at a first time; and second configuration information different from the first configuration information in configuration of the work environment at a second time different from the first time.

3. The data extracting apparatus according to claim 1, wherein the specific configuration information is the latest configuration information registered before the acquisition time of the sensor data out of the configuration information.

4. The data extracting apparatus according to claim 1, wherein, in the extraction processing, the processor extracts identification information on a specific machine out of the group of machines as the first related data, based on a hierarchical relationship with a specific sensor that has detected the specific event out of the group of sensors in the machine configuration information.

5. The data extracting apparatus according to claim 4, wherein, in the extraction processing, the processor traces the hierarchical relationship of the group of machines in the machine configuration information, to thereby extract identification information on another machine directly or indirectly coupled to the specific machine as the second related data.

6. The data extracting apparatus according to claim 1, wherein the configuration information further comprises worker configuration information that defines, in a graph form, a hierarchical relationship among the group of sensors and a group of workers who are assigned or movable in the work environment.

7. The data extracting apparatus according to claim 1, wherein
the machine configuration information further defines, in a graph form, a hierarchical relationship among a first group of sensors out of the group of sensors and a group of machines that are installed or movable in the work environment; and
the configuration information further comprises worker configuration information defining, in a graph form, a hierarchical relationship among a second group of sensors out of the group of sensors and a group of workers who are assigned or movable in the work environment.

8. The data extracting apparatus according to claim 7, wherein the machine configuration information comprises location information on each machine of the group of machines,
wherein the worker configuration information comprises location information on each worker of the group of workers, and
wherein, in the extraction processing, the processor extracts identification information and location information on a specific worker from the worker configuration information based on a hierarchical relationship with a specific sensor that has detected the specific event out of the group of sensors in the worker configuration information, and extracts identification information on a specific machine out of the group of machines as the first related data from the machine configuration information, based on the location information on the specific worker and the location information on the group of machines.

9. The data extracting apparatus according to claim 8, wherein the specific machine is determined based on which machine in the group of machines is located closest to the specific worker.

10. The data extracting apparatus according to claim 1, wherein, in the output processing, the processor outputs the specific event and the first related data so as to allow the specific event and the first related data to be displayed.

11. The data extracting apparatus according to claim 1,
wherein the data extracting apparatus is configured to access a search dictionary that associates the event, the data extraction rule, and a search keyword with one another, and
wherein, in the extraction processing, when the specific event and an input keyword are received and a specific keyword associated with the specific event matches the input keyword, the processor extracts related data related to the specific event from specific configuration information corresponding to an acquisition time of the sensor data out of the configuration information, based on the specific data extraction rule corresponding to the specific event in the search dictionary.

12. A data extracting method to be executed by a data extracting apparatus, the data extracting apparatus comprising:
a processor configured to execute a program; and
a storage device configured to store the program,
the data extracting apparatus being configured to access: configuration information that defines a work environment including a group of sensors; and a data extraction rule, which is used for extraction from the configuration information, and is defined for each event that indicates one of a change and abnormality of the work environment,
the data extracting method, which is executed by the processor, comprising:
detecting a specific event based on sensor data from the group of sensors;
extracting related data related to the specific event from specific configuration information corresponding to an acquisition time of the sensor data out of the configuration information, based on a specific data extraction rule corresponding to the specific event detected in the detecting; and
outputting the related data extracted in the extracting;
wherein the configuration information comprises machine configuration information that defines, in a graph form, a hierarchical relationship among the group of sensors and a group of machines that are installed or movable in the work environment.

13. A computer-readable recording medium having recorded thereon a data extraction program to be executed by a processor,
the processor being configured to access: configuration information that defines a work environment including a group of sensors; and a data extraction rule, which is used for extraction from the configuration information, and is defined for each event that indicates one of a change and abnormality of the work environment,
the data extraction program causing the processor to execute:
detection processing of detecting a specific event based on sensor data from the group of sensors;
extraction processing of extracting related data related to the specific event from specific configuration information corresponding to an acquisition time of the sensor data out of the configuration information, based on a specific data extraction rule corresponding to the specific event detected by the detection processing; and
output processing of outputting the related data extracted by the extraction processing;
wherein the configuration information comprises machine configuration information that defines, in a graph form, a hierarchical relationship among the group of sensors and a group of machines that are installed or movable in the work environment.

\* \* \* \* \*